United States Patent
Dika et al.

[11] 3,848,648
[45] Nov. 19, 1974

[54] TREE FELLING APPARATUS

[76] Inventors: Michael Dika; Jerry Felix Dika, both of P.O. Box 117, Rycroft, Alberta, Canada

[22] Filed: Apr. 6, 1973

[21] Appl. No.: 348,742

[52] U.S. Cl. ........... 144/34 A, 144/34 R, 144/34 E, 144/3 D
[51] Int. Cl. ............................................ A01q 23/08
[58] Field of Search .... 144/34 R, 34 A, 34 B, 34 E, 144/3 R, 3 D, 2 Z, 309 AC

[56] References Cited
UNITED STATES PATENTS

| | | | |
|---|---|---|---|
| 3,074,447 | 1/1963 | Bombardier | 144/3 D |
| 3,140,736 | 7/1964 | Propst | 144/2 Z X |
| 3,364,960 | 1/1968 | Collins, Jr. et al. | 144/34 R X |
| 3,364,964 | 1/1968 | Lacey | 144/34 E |
| 3,565,138 | 2/1971 | Albright | 144/34 R X |
| 3,638,694 | 2/1972 | Robinson et al. | 144/34 E X |
| 3,672,412 | 6/1972 | Albright | 144/34 A X |

*Primary Examiner*—Travis S. McGehee
*Assistant Examiner*—W. D. Bray
*Attorney, Agent, or Firm*—Ernest Peter Johnson

[57] ABSTRACT

A tree feller is involved of the known type wherein a guide bar carrying a saw chain is pivotally mounted on a frame and closes in a horizontal plane toward an anvil. In the invention, the guide bar includes a guard extending over the return run of the saw chain. A housing extends forwardly, from the frame, parallel to but spaced from the anvil. The guide bar retracts into this housing in the open position so that the working run of the saw chain is protected. The kerf of the cut made by the saw chain is equal to or greater than the thickness of the guide bar and guard. A pusher is provided to control the direction of felling. Upstanding shoulders on the anvil and housing prevent the tree butt from skidding to either side. A hydraulic cylinder biases the guide bar and saw chain toward the anvil. The rate of expansion of this cylinder is controlled relative to the load on the saw chain, hence the saw advances slowly at the centre of the tree but rapidly when the cut is almost complete. The feller is characterized by: a non-wedging cutting action, so that splitting is reduced; a saw chain which is protected at all times; and efficient use of its cutting power.

7 Claims, 15 Drawing Figures

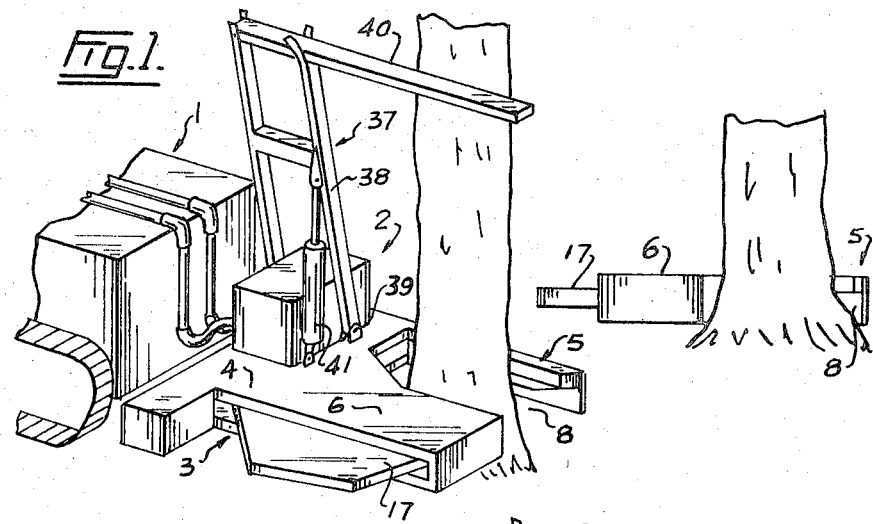
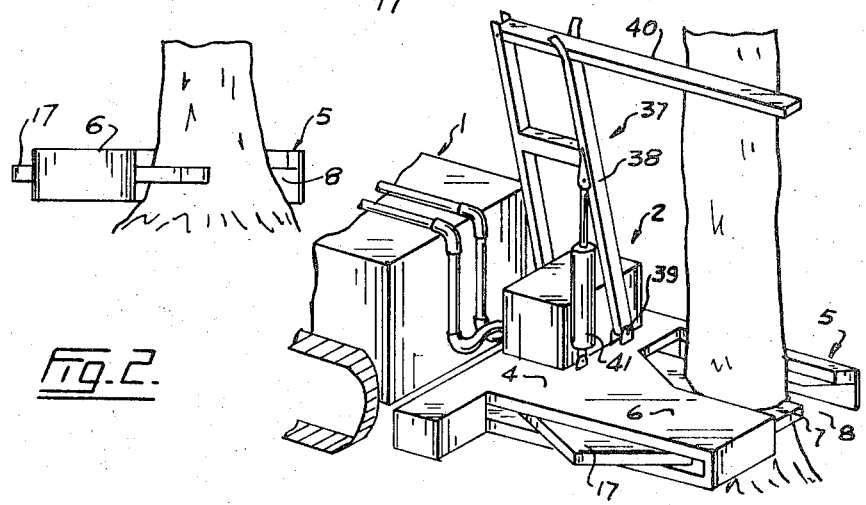
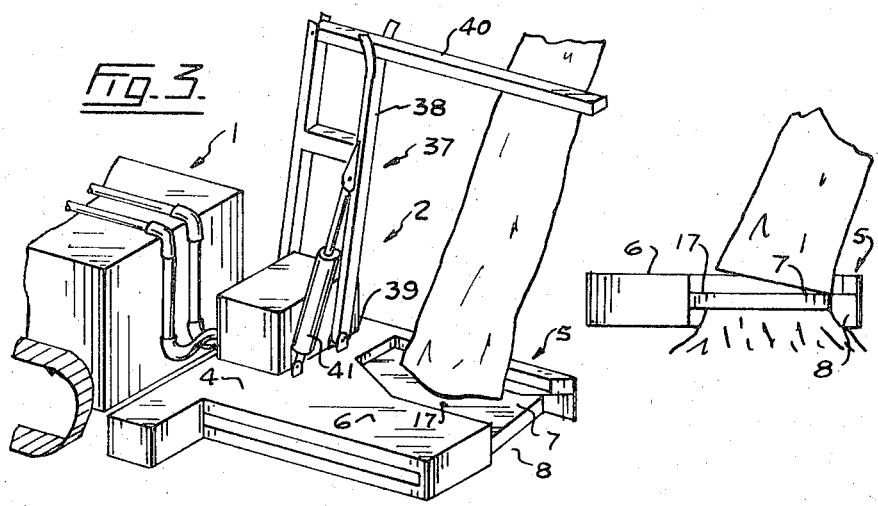

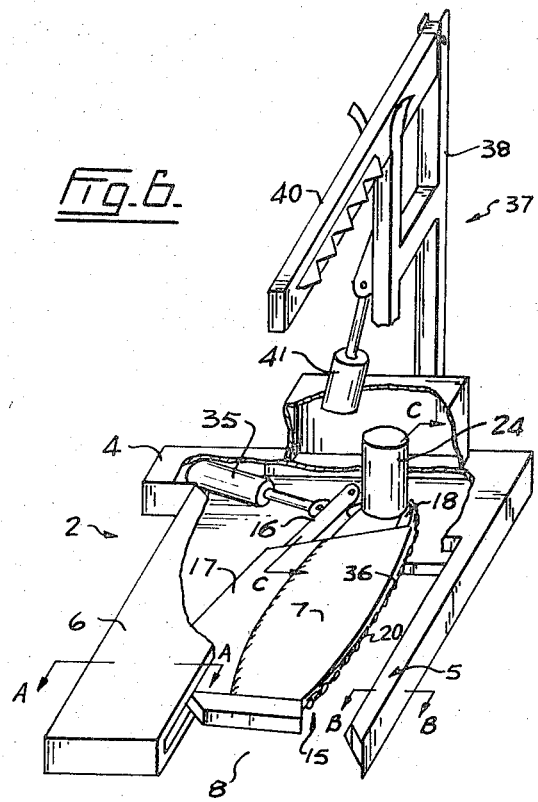
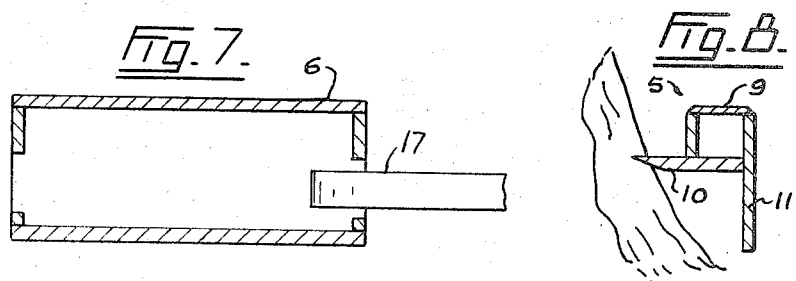
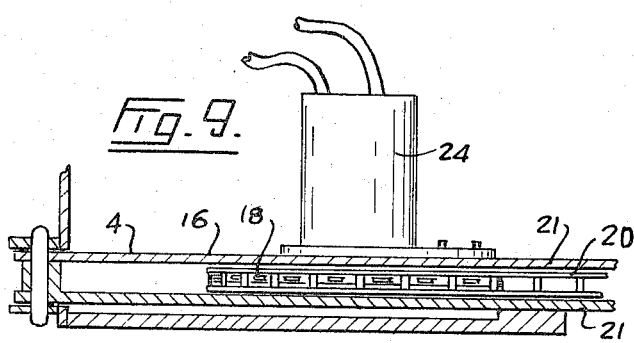

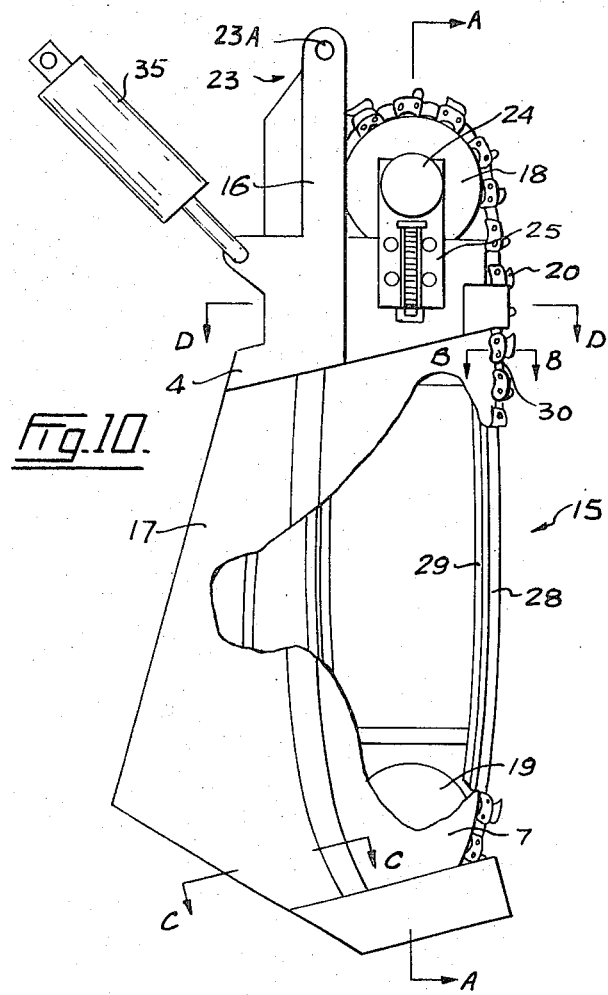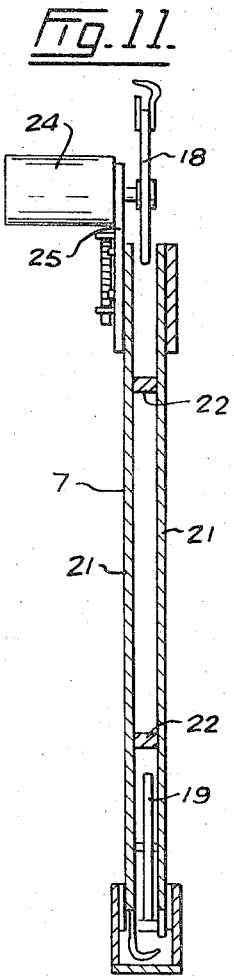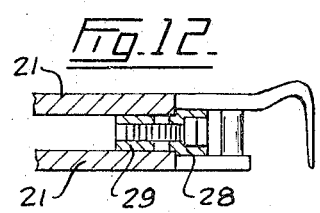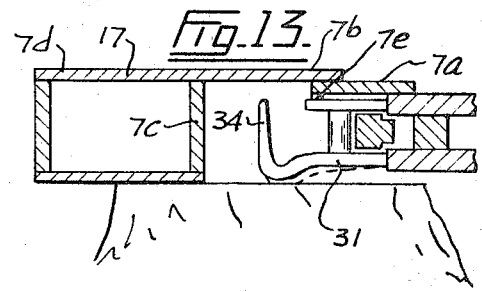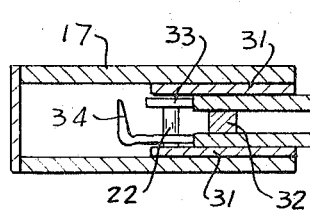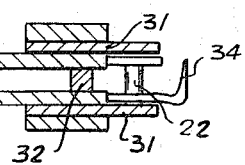

TREE FELLING APPARATUS

BACKGROUND OF THE INVENTION

This invention relates to a tree felling device. More particularly, it relates to that type of mechanical feeler which can be mounted on the front end of a carrier, such as a crawler tractor, and uses the carrier's hydraulic system to actuate a guide bar and saw chain to perform a scissor-type cutting action on a tree.

In recent years, mechanical fellers have been developed and used in the logging and pulpwood industries. This type of unit can be mounted on the yoke of a crawler tractor and manoeuvred into a cutting position at the base of a tree. The feller itself comprises a rigid frame having a forwardly extending, finger-like anvil. In use, this anvil is pressed against one side of the tree. A cutting member, which may be a shear blade or a guide bar and saw chain, is pivotally mounted at its rear end of the frame and can be biased in a horizontal plane to cut through the tree from the side opposite to that against which the anvil presses. In some cases, the feller includes an assembly termed the pusher. This is an upstanding beam having a cross bar at its upper end. The beam is pivotally attached at it lower end to the frame. A first hydraulic cylinder is provided to force the cutting element into the tree; a second hydraulic cylinder is provided to press the pusher against the tree at a point spaced above the cut, so as to control the direction of felling. When the cutting element is completing its cut, the tree is pivoted over the anvil by the pusher and falls to one side of the feller.

The prior art is exemplified by the following U.S. Pat. Nos. 3,672,412; 3,604,479; 3,612,115; and 3,565,138.

Both the shear and the saw chain guide bar of the prior art have wedge-shaped cross sections. In the case of the shear blade, this is needed to provide a sharp leading edge and sufficient strength in the blade to withstand the loads and stresses to which it is subjected. It should be kept in mind that these loads and stresses are substantial as a machine weighing in the order of 50,000 pounds is rigidly connected to the feller and this machine frequently shifts about as snow or brush give way beneath it during the felling operation. In the case of the guide bar, it has been the practice to use stock size saw chains, which have a maximum pitch of about three-quarter inches. To build strength into the bar, the wedge-shaped cross section has been adopted.

The use of the wedge-shaped cutting element causes an undesirable phenomenom, known as butt-shattering, to occur. As the cutting element progresses through the tree, it forces the tree over and longitudinal splitting frequently takes place. This problem is aggravated when felling is done at sub-zero temperatures. It has been reported that the loss in luber due to butt-shattering may run as high as 15 percent in cold weather.

SUMMARY OF THE INVENTION

It is therefore among the objects of this invention to provide:
1. a feller which utilizes a non-wedging cutter bar and saw chain in combination with a pusher to provide a unit which can directionally fell trees without splitting;
2. a feller of this type having a guide bar and saw chain of sufficient strength to withstand the stresses applied to it in the felling operation;
3. a feller of this type having a saw chain which is protected from damage at all times;
4. a feller of this type having an undercut shear on the anvil to provide a clamping action on the tree and assist in obtaining a clean cut through the tree;
5. a feller having means for controlling the advance of the cutting element, said means being responsive to the saw chain load, whereby cutting speed is optimized;
6. a feller having means for indicating the relative position of the cutting element to the operator so that he will know when the cut is complete and it is safe to cast the tree to one side; and
7. a feller which combines a number of features to enable it to cut trees at a relatively rapid rate with little or no butt-shatter.

In accordance with the invention, a feller is provided having a guide bar and saw chain. A hollow housing, termed the boot, extends forwardly from the frame parallel to the anvil but in spaced relation therewith. When the guide bar is in the fully open position, it is retracted into this boot, thereby protecting the working run of the saw chain. When the guide bar is in the fully closed position, its forward guarded end abuts the anvil. A guard member is secured to the trailing portion of the guide bar and protectively encloses the top edge and rear face of the return run of the saw chain. When the guide bar is in the closed position, this guard member extends back as far as the boot so as to prevent a cut tree slipping between them. The inner vertical face of the boot extends above the top surface of the guide bar. This face or shoulder provides a "fence" which restrains a tree butt from skidding off the guide bar. The saw chain is adapted to make a cut whose kerf is equal to or greater than the thickness of the guide bar-guard member unit. Thus the unit can move through the tree without wedging it over. A pusher assembly is provided to press against at the tree at a point spaced above the cut -- this assembly functions to control the direction of felling. It is seen, therefore, that the invention provides a feller which cuts without wedging and causing butt shatter. The combination of the boot and pusher assembly enable the unit to fell directionally, even uphill. Finally, the boot shoulder can be used to cast the tree through the air to one side when the crawler tractor is rotated in that direction.

In accordance with another aspect of the invention, the anvil of the device includes an undercut shear facing the saw chain. This shear provides an overhang under which the working run of the saw chain moves when the cut is complete. By providing a combination of opposed saw and shear cuts, a hinge of uncut wood is created about which the tree begins to topple without appreciable splitting and in a pre-determined direction.

In accordance with another aspect of the invention, a hydraulic circuit is provided to control the rate of advance of the guide bar and saw chain through the tree in response to the load on the saw chain, which rotates at a constant speed. Thus the rate of advance is slowest when the cut reaches the centre of the tree and approaches its maximum when the cut is almost complete. This latter point is of interest for the following reason. As stated, the undercut shear and the advancing guide bar and saw chain form a wooden hinge. Urged by the pusher assembly, the tree begins to rotate about this hinge when it becomes thin enough. The now rapidly advancing saw chain cuts through the hinge as the tree rotates. The end result is the tree is cleanly cut with little, if any, splitting damage.

In accordance with still another aspect of the invention, the device is provided with means for indicating to the operator the relative position of the guide bar. This is needed information when he desires to cast or push the cut tree to the side. The casting technique requires the operator to raise the feeler and simultaneously rotate his carrier at the moment that the cut is complete; the rising and rotating boot shoulder catches the tree butt and drives it outwardly and upwardly. It is common in using the device to cast trees 10 feet to one side. This is useful, since it enables the operator to remove the cut trees from the immediate area of his tractor.

DESCRIPTION OF THE DRAWINGS

In the drawing:

FIG. 1 is a perspective view, in two parts, showing the feller, mounted on a tractor, in position at a tree with the pressure bar activated just prior to beginning a cut -- the second part of this figure is a front view showing only the base of the tree and the cutting element, boot and anvil portions of the device;

FIG. 2 is similar to the perspective view of FIG. 1, except that it shows the feller having cut approximately half way through the tree;

FIG. 3 is a view similar to FIGS. 1 and 2, showing the arrangement of the parts when the cut is complete and the pusher bar has been activated to push the tree clear of the stump;

FIG. 6 is a cutaway perspective view of the feller with the cutting element in the mid-cut position, showing the guide bar, frame, pusher assembly, hydraulic motor and hydraulic cylinders;

FIG. 7 is a sectional view, taken along the line A—A in FIG. 6, showing the boot and a simplified form of the cutting element;

FIG. 8 is a front sectional view, taken along the line B—B in FIG. 6, showing the anvil in position against a tree;

FIG. 9 is a sectional view, taken along the line C—C in FIG. 6, showing the pivoted end of the cutting element;

FIG. 10 is a partially cutaway plan view of the cutting element and the hydraulic cylinder which advances it;

FIG. 11 is a sectional view, taken along line A—A in FIG. 10, showing the guide bar, sprockets, saw chain and hydraulic motor;

FIG. 12 is a sectional view, taken along the line B—B on FIG. 10, showing the guide bar, wear Bar, and sawtooth details;

FIG. 13 is a sectional view, taken along the line C—C in FIG. 10, showing the guide bar and guard member details;

FIG. 14 is a sectional view, along the line D—D in FIG. 10, showing the cross section of the guide bar and the saw chain mounted thereon, with some parts omitted.

DESCRIPTION OF THE PREFERRED EMBODIMENT

Figure 4:
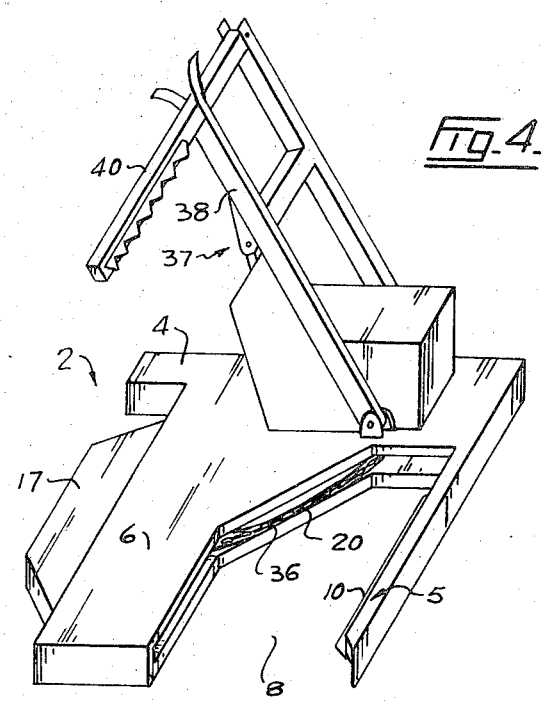
FIG. 4 is a perspective view of the feller with the cutting element completely retracted into the boot.

With reference now to FIGS. 1 — 3, there is shown a crawler tractor, carrying a feller 2 at its front end. The feller 2 is normally pivotally mounted on the yoke of the tractor 1, although, for purposes of simplification, this has not been shown in the drawings. The feller 2 comprises a frame 3, having a base 4 and an anvil 5 extending forwardly therefrom. A boot or hollow housing 6 is secured to the base 4 and extends forwardly therefrom in spaced relation to the anvil 5. The sides of the U-shaped boot 6 are open to accommodate the guide bar 7, as described below. The base, anvil and boot form a rigid, sturdy unit and are normally formed of welded steel construction. The U-shaped unit defines an opening 8 for receiving the tree to be cut; by correctly sizing this opening, one can preclude the operator from using the feller on trees which are too big for its design capability.

As shown in FIG. 8, the anvil 5 includes a box section 9. The bottom wall 10 of the box section 9 extends inwardly and has its edge sharpened to provide an undercut shear. The outer side wall 11 extends downwardly to provide side protection for the saw chain. In use, the anvil 5 is clamped against one side of the tree and locates the rest of the equipment in the desired felling position. The undercut shear 10 cuts into the tree. The side wall 11 presses down against the ground or tree roots to provide firm footing for the anvil 5. The relief between the shear 10 and side wall 11 enables the operator to position the anvil 5 very close to the base of the tree.

With reference now to FIGS. 6, 10, 13 and 14, a cutting assembly 15 is shown pivotally mounted at its inner end on the base 4. The assembly 15 can swing in a generally horizontal plane between an open position, wherein it is retracted into the boot 6, and a closed position, wherein it abuts the anvil 5. In general terms, the assembly 15 comprises a suspension frame 16, a guard member 17, a guide bar 7 having a drive sprocket 18 mounted on its rear end and an idler sprocket 19 mounted at its front end, and a saw chain 20 mounted on the cutter bar and sprockets for rotation therearound.

More particularly, as shown in FIGS. 10 and 11, the guide bar 7 is a box section formed by upper and lower plates 21 spaced apart by cross pieces 22. The suspension frame 16 is welded to the guide bar 7 and extends rearwardly therefrom. An aperture 23 is provided at one end of the suspension frame 16 to receive a pin 23A about which it can pivot. The idler sprocket 19 is rotatably mounted between the plates 21 at their front ends. The drive sprocket 18 is mounted on the shaft of a hydraulic motor 24 mounted on a bracket 25 attached to the upper plate 21. The drive sprocket 18 is positioned at the rear ends of the guide bar plates 21 in the same plane as the idler sprocket 19. The drive sprocket 18, motor 24 and motor actuating means described below combine to provide means for rotating the saw chain 20.

As shown in FIG. 13, a guard member 17 is secured to the trailing edge of the guide bar 7. The guard member 17 comprises a chain guide 7a, a chain guard 7b having a downwardly extending leg 7c, and a casting platform 7d. The chain guide 7a has a hard-faced bead 7e which bears down on the tooth side plate 31; this prevents the tooth 34 rubbing against the chain guard 7b and becoming dulled. The chain guard 7b functions to protect the upper side edge of the return run of the saw chain 20 from a skidding tree trunk. Its leg 7c protects the saw chain 20 from impacts from above or below. The casting platform 7d is quite wide and extends back as far as the boot 6 when the cutting assembly 15 is in the closed position, thereby preventing a cut tree falling between the assembly 15 and the boot 6.

The saw chain 20 is shown in details 12 – 14. It is of the straddle type and rides on and is guided by a wear bar 28. More particularly, a reinforcing bar 29 is welded in place between the guide bar plates 21 adjacent their side edges. Threaded holes are bored in the bar 29 at intervals along its length. The wear bar 28, of T-shaped section, is bolted to the bar 29. The cross bar 20 of the wear bar 29 is seated on the side edges of the plates 21, but occupies only the inner portions of those edges. The tooth side plates 31 of the saw chain 20 are positioned on the outside of the wear bar 29 and ride on the exposed surfaces of the side edges 30. The tooth side plates 31 are welded to the spreaders 32 to form solid units and these units are connected by the roller chain links 33. The teeth 34 of the saw chain 20 are adapted, as illustrated, to make a cut whose kerf is substantially equal to or greater than the thickness of the guide bar 7 and its associated guard member 17. By way of example, we build a guide bar having a thickness of 2 inches and mount on it a saw chain whose measured kerf is 2¼ inches.

Figure 5:
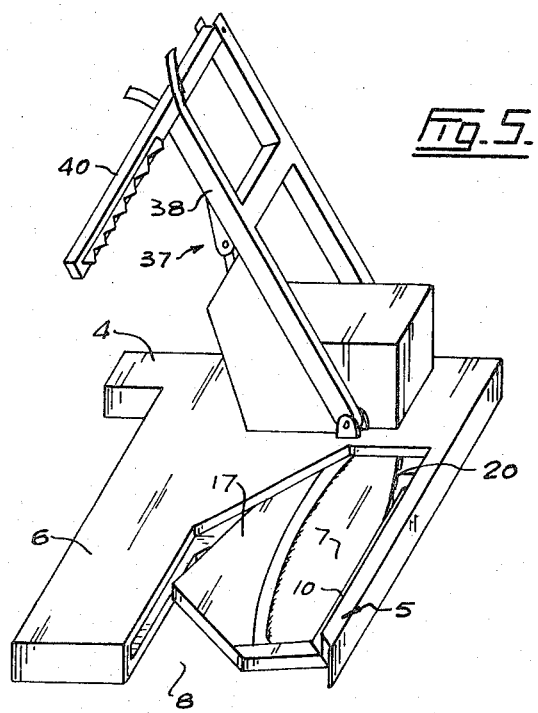
FIG. 5 is a perspective view similar to that of FIG. 4, with the cutting element in the closed position abutting the anvil.

A hydraulic cylinder 35 is attached at its ends to the base 4 and suspension frame 16 respectively. When actuated, the cylinder 35 advances the guide bar 7, around its pivot pin connection, from the open position illustrated in FIG. 4 to the closed position shown in FIG. 5. It will be noted that, in the open position, the working run 36 of the saw chain 20 is protected by the boot 6, while in the closed position it is hidden beneath the undercut shear 10 and protected thereby.

A pusher assembly 37 is provided for controlling the direction of felling. It comprises an upright beam 38, rotatably attached by the pivot connection 39 to the base 4. A cross bar 40 is pivotally attached to the upper end of the frame 38 for pressing against the tree. A hydraulic cylinder 41 is suitably connected to the base 4 and beam frame 38 to rotate the pusher assembly 37 about its pivot point. In practice the pivotal or hinge attachment of the rear end of the cross bar 40 to the frame 38 allows the cross bar to adjust, without scraping along the tree, to the difference in centres of pivot 39 and the pivot point of the tree as it begins to fall. Another function of this hinge is to allow the cross bar to readily move should a large tree butt strike it from beneath, and thereby prevents excess strain and possible damage to the assembly.

Figure 15:
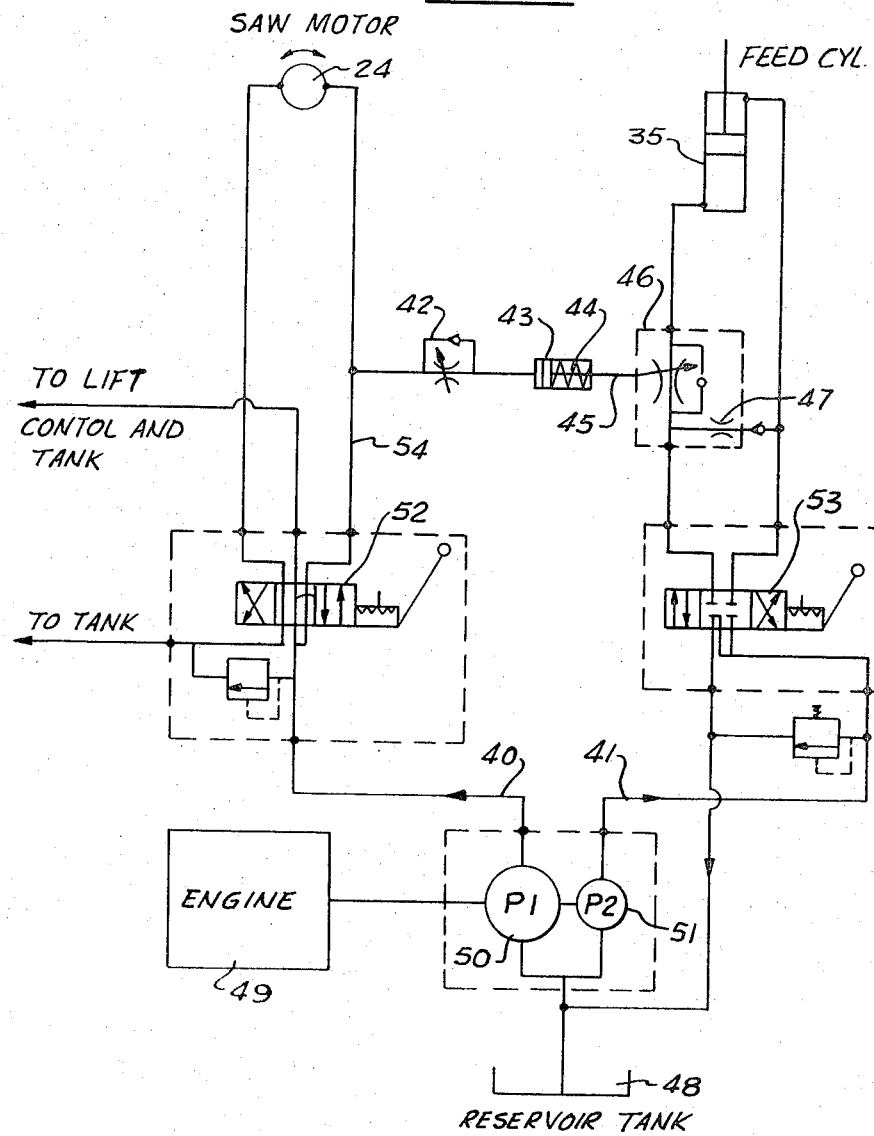
FIG. 15 is a schematic of the hydraulic circuit incorporated into the invention.

With reference now to FIG. 15, the governor is located between the saw motor circuit 40 and the feed cylinder circuit 41. The governor comprises a variable directional flow control 42, a hydraulic cylinder 43, and a variable spring 44 acting against cylinder 43. The governor piston 45 is connected to the actuating mechanism of a variable flow divider 46, which directs fluid flow to feed cylinder 35 and through orifice 47 back to tank 48. In operation, the carrier's engine 49 turns two hydraulic pumps 50, 51 which energize saw motor circuit 40 and feed cylinder circuit 41. The saw motor 24 and feed cylinder 35 are energized simultaneously by directional control valves 52, 53. As the fluid pressure builds up in line 54 due to resistance at saw motor 24, the piston of the governor cylinder 43 is forced against variable spring 44. At the same time, resulting movement of the governor piston 45 adjusts the actuating mechanism of variable flow divider 46 from a fully open position (which directs all fluid flow to cylinder 35) to a partially open position (which directs part of the fluid flow to cylinder 35 and part through orifice 47 back to tank 48). The proportionate flows to cylinder 35 and orifice 47 can be varied from 0 to maximum G.P.M. by moving the actuating mechanism of variable flow divider 46 to its extremities. Thus the more resistance (load) built up on the saw motor 24, the further spring 44 is compressed by governor cylinder 43, which results in a further closing off of oil flow to feed cylinder 35, thereby reducing the speed with which the saw chain is fed into the tree. This eases the load on the saw motor 24. With proper setting of the variable spring 44, an optimum load can be kept on the saw motor 24 at all times when the actual cut is being made. The variable directional flow control 42 is used to adjust or dampen the return of the governor piston 45 when pressure suddenly drops in the hydraulic line 54. With proper adjustment, this prevents the governor from "hunting" for a balance between load and feed functions.

In operation, the tractor is manoeuvred to locate the tree in the opening between the anvil and boot. The tractor is then swung to bring the anvil against the tree and embed the undercut shear in it. The operator can normally see the anvil and is able to accurately position it. This properly locates the rest of the device, a goodly portion of which the operator cannot see from the tractor cab. The pusher cylinder is then actuated to press the pusher cross bar against the tree with a predetermined pressure. The machine is now tightly clamped to the tree. At this point, the hydraulic system is engaged to commece rotating the saw chain. At the same time, the guide bar cylinder is actuated and the saw chain is advanced into the tree. It makes a cut which is slightly wider than the thickness of the guide bar and guard member. The pusher pressure is controlled during cutting to try to keep the tree as straight as possible without exerting excess pressure, such as might prematurely topple the tree over. As the operator notes from his indicator means that the guide bar is approaching the anvil, he increases the pusher assembly pressure, causing the tree to begin to rotate about the hinge of wood defined between the saw chain and shear. At the same time, the rate of advance of the guide bar through the tree is accelerating as there is less load on the saw chain; hence the hinge is cut through before any substantial degree of tree rotation takes place. The working run of the saw chain slips beneath the undercut shear and is protected from the tree butt. The pusher assembly rotates the tree over the anvil shoulder so that it falls at about 90° to the longitudinal axis of the anvil.

This invention is characterized by the following advantages:

1. the saw chain runs are protected at all times;

2. wedging over of the tree is eliminated, thereby reducing butt shatter;
3. the combination of an undercut shear, saw chain, and a pusher assembly provides directionally-controlled felling and a clean cut;
4. the boot and anvil shoulders bracket the tree butt and largely prevent the tree from skidding across the cutter bar and ending up athwart the unit;
5. the hydraulic circuit controls the load on the saw chain, in a manner whereby it does not easily jam and is moving quickly at the end of the cut;
6. the operator is cognizant of the relative location of the cutter bar, although he cannot see it - he is therefore able to actuate the tractor and boot shoulder to cast the cut tree at the appropriate moment; and
7. the undercut shear and anvil is designed to make it possible to locate it close to the ground, with the result that the product stump is relatively short.

We claim:

1. A tree feller comprising:
a frame having a base and an anvil extending forwardly therefrom;
a cutting assembly comprising a guide bar, pivotally mounted at its inner end on the base, having an endless, driven saw chain mounted on its peripheral portion, said cutting assembly further comprising a guard member, associated with the guide bar, for protecting the upper and lower side surfaces of the return portion of the saw chain, said guide bar and guard member having substantially parallel top and bottom surfaces;
means for rotating the saw chain about the guide bar;

means for advancing the cutting assembly from an open position to a closed position adjacent the anvil, whereby a tree located between them may be cut by the saw chain;
a pusher assembly associated with the frame and adapted to contact a tree being cut at a point spaced above the guide bar;
means for pressing the upper portion of the pusher assembly against the tree to control the direction of its fall;
said saw chain being of sufficient size to make a cut having a kerf substantially equal to or greater than the thickness of the guide bar and associated guard plate, whereby the tree may be cut without any substantial wedging action.

2. The tree feller as set forth in claim 1 wherein:
a hollow housing is secured to the base and extends forwardly therefrom in spaced relation to the anvil, said housing being adapted to receive the guide bar when it is in the open position to protect the working run of the saw chain.

3. A tree feller as set forth in claim 1, comprising:
means for controlling the rate of advance of the cutting assembly responsive to the load on the saw chain; and
said anvil carrying an undercut shear extending inwardly toward the cutting assembly and positioned so that the working run of the saw chain is disposed beneath it when the guide bar has moved to the closed position and the cut is complete.

4. The free feller as set forth in claim 2 wherein:
the guard member is sufficiently wide so as to extend from the guide bar substantially to the housing when the guide bar is in the closed position, whereby a cut tree is prevented from dropping between the guide bar and housing.

5. The tree feller of claim 1 comprising:
a drive sprocket associated with the guide bar and adapted to rotate the saw chain, and
a first hydraulic circuit, comprising a pump and a motor, for rotating the drive sprocket;
a hydraulic cylinder attached at one end to the frame and at the other end to the guide bar;
a second hydraulic circuit, comprising a pump, for actuating the cylinder to advance the guide bar from the open to the closed position;
said second circuit being responsive to the load on the first circuit so as to slow the rate of advance as the load increases and accelerate it as the load decreases.

6. The tree feller as set forth in claim 3 wherein:
the guide bar is formed of interconnected, vertically spaced apart parallel members; and
the saw chain is of the straddle type and rides on the side edges of said guide bar members.

7. In a tree feller for use in conjunction with a bulldozer, having a frame comprising a base and an anvil, a cutting assembly pivotally mounted on the base and comprising a guide bar carrying an endless saw chain, said anvil spaced from the cutting assembly and extending forwardly from the base, means for rotating the saw chain on the guide bar, and means for advancing the cutting assembly toward the anvil, the improvement which comprises the combination of:
an undercut shear carried by the anvil, extending inwardly toward the cutting element and positioned so that the working run of the saw chain is disposed beneath it at the completion of its cut;
means for controlling the rate of advance of the cutting assembly toward the anvil responsive to the load on the saw chain;
a pusher assembly associated with the frame and adapted to contact a tree being cut at a point spaced above the guide bar; and
means for pressing the upper portion of the pusher assembly against a tree being cut to control the direction of its fall over the anvil.

* * * * *